(12) United States Patent
Bjorndahl

(10) Patent No.: US 6,396,612 B1
(45) Date of Patent: May 28, 2002

(54) SYSTEM, METHOD AND APPARATUS FOR SECURE TRANSMISSION OF CONFIDENTIAL INFORMATION

(75) Inventor: Per Bjorndahl, Lindingo (SE)

(73) Assignee: Telefonaktiebolaget L M Ericsson, Stockholm (SE)

(*) Notice: Subject to any disclaimer, the term of this patent is extended or adjusted under 35 U.S.C. 154(b) by 0 days.

(21) Appl. No.: 09/022,289

(22) Filed: Feb. 11, 1998

(51) Int. Cl.[7] .............................................. H04B 10/00
(52) U.S. Cl. ...................... 359/172; 359/152; 359/145; 340/825.72; 340/825.69; 340/825.16
(58) Field of Search ................................ 359/172, 152, 359/145; 340/825.72, 825.69, 825.16

(56) References Cited

U.S. PATENT DOCUMENTS

| | | | |
|---|---|---|---|
| 4,856,046 A | | 8/1989 | Streck et al. ................. 379/56 |
| 4,904,993 A | * | 2/1990 | Sato ............................ 340/825 |
| 5,034,997 A | * | 7/1991 | Iwasaki ....................... 455/617 |
| 5,301,353 A | * | 4/1994 | Borras et al. ................... 455/9 |
| 5,404,572 A | * | 4/1995 | Ishii ............................. 455/67.4 |
| 5,446,783 A | | 8/1995 | May ............................... 379/59 |
| 5,479,595 A | * | 12/1995 | Israelsson ................... 359/145 |
| 5,508,836 A | | 4/1996 | DeCaro et al. ............. 359/189 |
| 5,564,020 A | | 10/1996 | Rossi ....................... 395/200.15 |
| 5,585,953 A | * | 12/1996 | Zavrel ......................... 359/152 |
| 5,588,009 A | | 12/1996 | Will .............................. 371/33 |
| 5,608,723 A | * | 3/1997 | Felsenstein ................. 370/335 |
| 5,617,236 A | | 4/1997 | Wang ........................... 359/172 |
| 5,617,449 A | | 4/1997 | Tanaka ......................... 375/219 |
| 5,636,265 A | | 6/1997 | Slavuori et al. ................. 379/56 |
| 5,659,883 A | * | 8/1997 | Walker et al. ................. 455/59 |
| 5,812,293 A | * | 9/1998 | Yen ............................. 359/145 |
| 5,819,184 A | | 10/1998 | Cashman .................... 455/553 |
| 5,835,862 A | | 11/1998 | Nykanen et al. ........... 455/558 |
| 5,844,939 A | | 12/1998 | Scherer et al. ............. 375/219 |
| 5,850,444 A | * | 12/1998 | Rune ............................ 380/21 |
| 5,915,021 A | * | 6/1999 | Herlin et al. .................. 380/21 |
| 5,917,425 A | * | 6/1999 | Crimmins et al. .......... 340/825 |
| 5,946,120 A | * | 8/1999 | Chen ........................... 359/158 |
| 5,953,323 A | * | 9/1999 | Haartsen ..................... 370/330 |

FOREIGN PATENT DOCUMENTS

| | | |
|---|---|---|
| DE | 19629408 A1 | 7/1996 |
| EP | 0 756 397 A2 | 7/1996 |
| EP | 0 806 878 A2 | 5/1997 |

* cited by examiner

Primary Examiner—Leslie Pascal
Assistant Examiner—Hanh Phan
(74) Attorney, Agent, or Firm—Jenkens & Gilchrist, P.C.

(57) ABSTRACT

A system, method and apparatus for establishing a secure wireless radio communications link between two devices that minimizes the exposure of sensitive information to third party interception is disclosed. The secure link is established by first establishing an infrared link between the two devices for the exchange of sensitive information, such as encryption information. Subsequent communications would then have the benefit of encryption protection, establishing the secure wireless radio communications link.

38 Claims, 2 Drawing Sheets

SYSTEM, METHOD AND APPARATUS FOR SECURE TRANSMISSION OF CONFIDENTIAL INFORMATION

BACKGROUND OF THE PRESENT INVENTION

Field of the invention

The present invention relates generally to a system, method and apparatus for establishing a secure wireless communications link between two devices that minimizes the risk of third party interception of sensitive information, such as may be exchanged during communication initialization.

BACKGROUND AND OBJECTS OF THE PRESENT INVENTION

The evolution of wireless communication over the past century, since Guglielmo Marconi's 1897 demonstration of radio's ability to provide continuous contact with ships sailing the English Channel, has been remarkable. Since Marconi's discovery, new wireline and wireless communication methods, services and standards have been adopted by people throughout the world. This evolution has been accelerating, particularly over the least ten years, during which the mobile radio communications industry has grown by orders of magnitude, fueled by numerous technological advances that have made portable radio equipment smaller, cheaper and more reliable. The exponential growth of mobile telephony will continue to rise in the coming decades as well, as this wireless network interacts with and eventually overtakes the existing wireline networks.

Cordless telephony has also been a part of the exponential rise in wireless telephony. Cordless telephones were originally aimed at providing economical, tetherless voice communications inside residences, i.e., using a short wireless link to replace the cord between a telephone base unit and its handset. Although early cordless phones were of marginal quality, with the introduction of improved cordless phones in the 1980s sales dramatically increased. More recent advances, particularly in Europe, have extended the use domain of cordless phones outside of residences.

Another European revolution of cordless telephones is the digital enhanced cordless communications (DECT) standard, which was optimized for use inside buildings. DECT controllers may hand off active calls from one base unit to another as the users move, and can page or ring handsets as a user walks through areas covered by different base units. As is understood in the art, however, the range of cordless telephones is greatly limited compared to the more versatile cellular telephones, i. e., 0.3–30 or more kilometer range for cellular and less than 100 meters in cordless systems, and usually only up to tens of meters.

More recently, the worlds of cellular and cordless telephony have begun to converge with the introduction of cordless standards compatible with that of its cellular cousin. Accordingly, a mobile cellular user may utilize their cellular telephones within a cordless telephony system, thereby avoiding the need to purchase proprietary and typically non-compatible cordless telephones. Shown in FIG. 1 is a private telephone system, generally referred to by the numeral 10, having at least one private base station 12 and a multiplicity of cellular phones 14 in communication therewith. When in a cordless mode a cellular user, e.g., at phone 14A, may communicate with another user within the private telephone system 10, e.g., another cordless-mode cellular phone 14B or a cordless phone 16, via the private base station 12 which serves as a relay.

One problem with the use of the cellular phones 14 within the private telephone system 10 is security. As discussed, original cordless telephones, e.g., phones 16 in FIG. 1 were stand-alone consumer products that did not require any interoperability specifications. In other words, each cordless phone came with its own base station and needed to be compatible only with that base station. Billing, security and privacy concerns within such systems were addressed by both preventing that cordless phone from operating with any other base station and limiting the transmission range of the cordless phones. With the convergence of cordless and cellular technologies and the use of interoperability specifications, however, the inherent physical limitations of the cordless systems no longer serve a security function. With cellular phones 14 being capable of transmitting their signals over many kilometers, the use of such phones within private telephone systems 10 raise genuine security considerations.

As is understood in the art, cellular phone 14A may communicate through the private base station 12 by use of encryption keys or other such security protocol, whereby the messages are encrypted and more difficult to decipher. Accordingly, even though the communications from a cellular user communicating within the private telephone system 10 may extend well outside the outer reaches of the system 10, the conversation or data exchanged is kept relatively confidential. Another problem, however, arises during communication initialization over the radio interface which must occur without encryption since no encryption keys have been exchanged between the cellular user, e.g., of cellular terminal 14A. The information is therefore being broadcast across a wide range, including the keys, until encryption protocols are established. Accordingly, third parties may listen in on such pre-encryption transmissions and acquire sensitive information.

Various techniques may be employed to thwart such eavesdropping. A first approach is to use a wireline connection for the initial information exchange, whereby the cellular phone 14A must be electrically connected to the private base station to start the private communication. This approach would, accordingly, require the definition of an electrical interface between the two components and limit the manufacturer's freedom to design attractive terminals since a standardized connector may increase the size and weight of the terminal. Further, such a definition may also restrict further improvements of such phones 14, e.g., moving to lower voltage technologies for energy conservation and size deduction.

An alternative approach would be using Subscriber Identity Modules (SIMs) in both the private base station 10 and the respective cellular terminal 14, whereby the requisite identification information is readily established and the proper keys applied without transmitting them. In addition to the added component costs, the use of two SIMs in this manner also adds to the administrative costs of mobile network operators who must allocate unique SIM pairings between the private base stations 20 and respective cellular terminals 14. Furthermore, there is a risk that a SIM meant for the cellular terminal 14 may instead be inserted into the private base station 12, further complicating this approach.

A third approach is to utilize the advantages of the radio interface, e.g., standardization. As discussed, however, because radio waves propagate through walls and over large distances, this also poses a security risk which must be overcome.

In view of the disadvantages of each of the aforementioned approaches, it is clear that there is a need for a simple and secure system and method for establishing a communications link between a first device, such as a cellular phone, and another device, such as a private base station.

It is, accordingly, an object of the present invention to provide a system, method and apparatus for establishing such a simple and secure communications link, whereby at least a portion of a transmission, particularly one containing sensitive information, may be transmitted clearly for proper reception while simultaneously minimizing the risk of interception.

SUMMARY OF THE INVENTION

The present invention is directed to a system, method and apparatus for establishing a secure wireless radio communications link between two devices that minimizes the exposure of sensitive information to third party interception. The secure link is established by establishing an infrared link between the two devices for the exchange of sensitive information, such as encryption information. Subsequent communications would then have the benefit of encryption protection, establishing the secure wireless radio communications link.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The use of infrared (IR) transmissions between diverse electronic devices, e.g., between a television and a remote controller, are known, e.g., U.S. Pat. Nos. 5,508,836, 5,588,009, 5,564,020, 5,617,236 and 5,446,783 each describe various IR-electronic interconnections. U.S. Pat. No. 5,636,264 similarly describes an IR interface between a phone handset and a computer. Although generally describing the usage of IR in these contexts, the references fail to discuss the aforementioned security problems inherent in wireless communications nor the proposed solution set forth in the present invention, described in more detail hereinafter.

Figure 2:
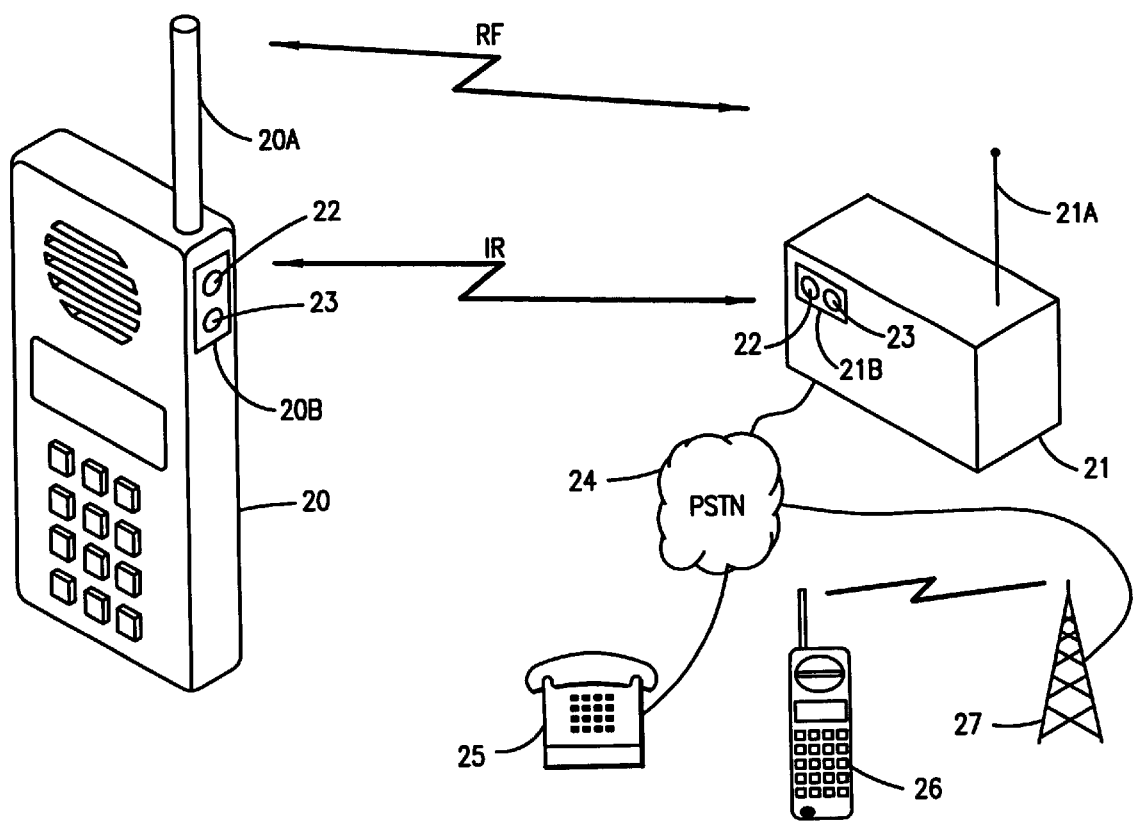
FIG. 2 illustrates a dual-mode radiofrequency and infrared mobile station and private base station in accordance with the present invention.

Shown in FIG. 2 is a dual mode mobile station 20 in communication with a dual mode private base station 21. As discussed, mobile station 20 communicates with the private base station 21 via an RF transmission, which has an effective range of hundreds of meters, and via a more limited, "cordless" communications mode having a much shorter, contained range. As is understood in the art, the RF transmission mode is via the respective antennae 20A and 21A of the mobile station 20 and private base station 21, respectively, the signals being transceived in a conventional manner.

Also shown in FIG. 2 are IR transceiver interfaces 20B and 21B on the mobile station 20 and private base station 21, respectively. Each interface preferably includes a photodetector 22 for receiving IR signals and an IR signal emitter 23 for transmitting such IR signals. It should be understood that the position of the interfaces 20B and 21B on the respective bodies of the mobile station 20 and the private base station 21 are arbitrary, provided the respective IR signals to and from the interfaces 20B and 21B are not blocked, e.g., by the palm or fingers of the phone user. In other words, ergonomic considerations may dictate particular placements for the interfaces, as is understood in the art.

With further reference to FIG. 2, one of the practical utilizations of the dual-mode mobile station 20 is now illustrated. In particular, when the dual-mode mobile station 20 comes within the more limited range of the private base station 21, e.g., in the same or an adjacent room, the subscriber may wish to transfer control from the cellular provider to the private system, e.g., to save money on the cheaper wireline phone rates through the private system to the Public Switched Telephone Network (PSTN). For example, through the PSTN 24, the mobile station 20 can communicate with remote wireline phones 25 and remote cellular phones 26 via a base transceiver system 27(shown for simplicity as a base transceiver station tower).

Figure 3:
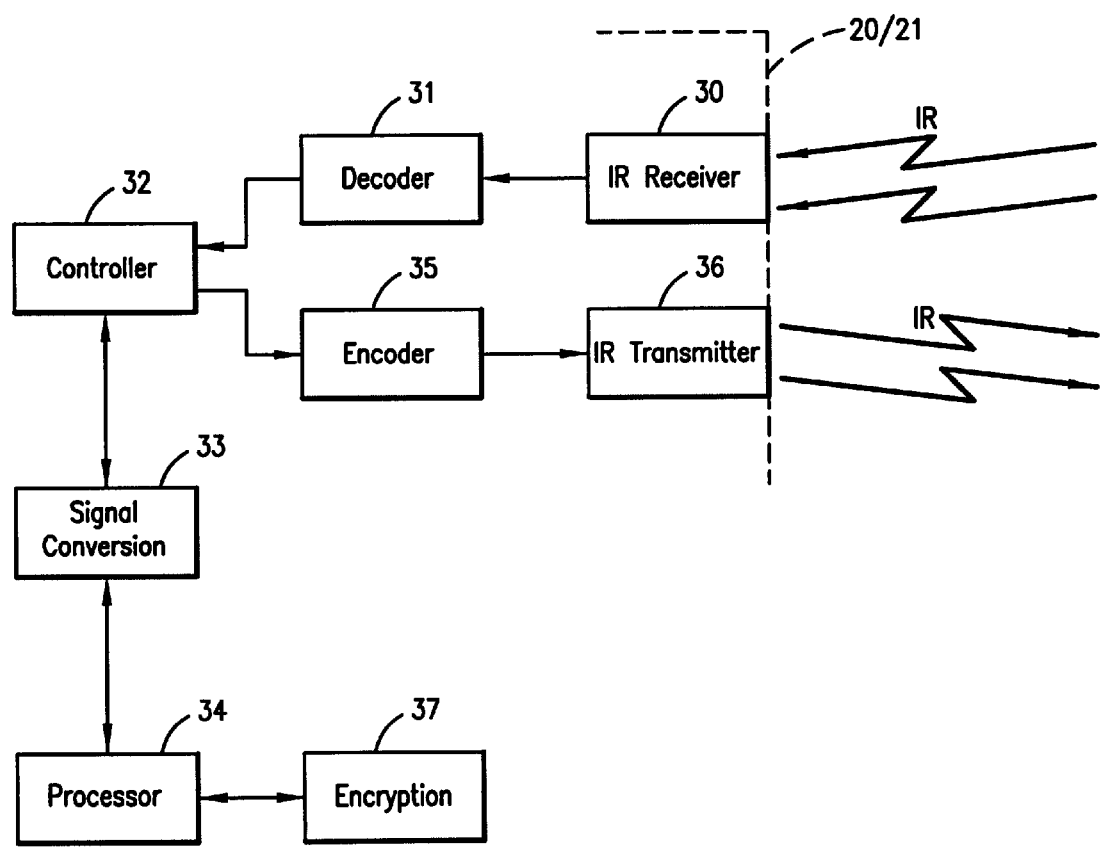
FIG. 3 illustrates various circuitry employed in the dual-mode devices shown in FIG. 2.

With reference now to FIG. 3 of the drawings, there is illustrated a portion of the mobile station 20 (in FIG. 2), particularly, the IR transceiver interface 20B and various circuitry within the mobile station 20 for handling the IR signals. An IR receiver or photodetector 30 receives the IR signals, such as from the private base station 21, and passes the signals to a decoder 31, which converts the infrared information within the IR signal to electrical information, e.g, digital pulses. The converted information is then forwarded to a controller 32, which controls the flow of the electrical information (pulses). A signal conversion device 33 receives the aforesaid electrical information flow and groups the incoming pulses into a unit size (frame) pursuant to a known signal format. The controller 32 may be a UART or other like controller, as is understood in the art.

Figure 1:
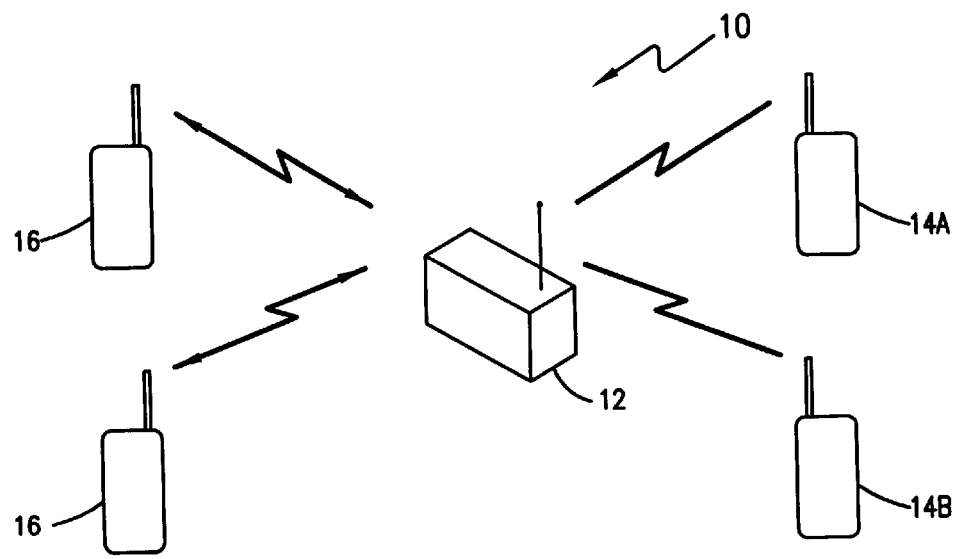
FIG. 1 is a schematic illustration of a private telephone system, including a private base station with cellular and cordless phones in communication therewith.

The incoming signal, now translated, is sent to a processor 34, which implements the command(s) set forth in the signal, e.g., forward the incoming signal to another phone such as mobile station 14B (in FIG. 1) across the RF communications link. Similarly, the processor 34, in response to one or more commands, may send a message across the IR communications link by first forwarding the message to the signal conversion device 33, which converts the structured message into the aforesaid electrical information or pulses, which the controller 32 sends to an encoder 35. The electrical pulses are there converted to IR radiation signals which are then transmitted by an IR transmitter 36, e.g., light emitting diodes, releasing the IR signal. It should, of course, be understood that the circuitry shown in FIG. 3 is preferably also incorporated within the private base station 21 so that a wireless IR dialogue may be established with the mobile station 20.

As discussed, the effective range of the IR signal so emitted is limited, e.g., on the order of several dozens of meters. With obstacles like walls, floors and ceilings, the effective range is even further reduced, as is encountered by consumers with products such as television remotes. Accordingly, IR signals provide an excellent way to exchange confidential information wirelessly, effectively limiting communications to a point-to-point conversation, albeit preferably temporarily until the security protocols are safely established. Eavesdropping, although still possible, is thwarted by such range restrictions since other security measures, e.g., building control, may be employed in conjunction to provide almost any level of interception prevention.

Since various encryption methods are available to make a wireless conversation almost impervious to code-breakers, wireless communications between a user of the dual-mode phone 20 (in FIGS. 2 and 3) preferably switches to the RF communications mode to utilize the enhanced security advantages of encryption to prevent deciphering. Wireless RF communications, however, even with encryption, are easily intercepted by a distant eavesdropper. Although encryption data may thwart the eavesdropper's deciphering the intercepted coded message, the caller and recipient must first establish the secure transmission through the exchange of encryption keys over a non-encrypted wireless communication, which the eavesdropper can monitor, easily decipher the pertinent keys and then decipher the supposedly secure encrypted transmissions.

The system, method and apparatus of the present invention provide an improved, more secure way to preserve the confidentiality of wirelessly transmitted information by restricting exposure of the encryption keys and any other confidential information through use of the aforementioned IR transmissions.

In one embodiment of the present invention the subscriber of mobile station 20 when sufficiently close to the private telephone system, e.g., near the private base station 21, activates the mobile station 20 to emit an IR signal, e.g., via IR transmitter 36. Alternatively, the mobile station 20 may activate IR signaling capability automatically in advance of transceiving any security-related data. In a preferred embodiment of the present invention, the mobile station utilizes conventional radiofrequencies for all non-security-related transmissions, e.g., when initiating communications with the private base station 21 such as a cordless telephone base station and after the exchange of encryption or other such security data. Upon reaching the aforementioned security data or protocols in the transmission, the mobile station 20 then switches over to the aforementioned IR signaling using the IR transmitter 36. It should be understood, that the RF-to-IR switchover may occur early in the transmission, e.g., in the initial communications attempts, or later during the transmission, so long as any secured portions of the signal are transmitted via IR transmissions.

In either event, the private base station 21 detects the IR signal transmission from the mobile station 20, via the aforementioned photodetector 30 in the station 21, processes the incoming IR signal, and responds with an IR response signal, which preferably includes an encryption key. It should be understood that one or more encryption keys may be inserted into the response signal by an encryption device 37 in communication with the processor 34. Upon the secure receipt of the encryption key(s) from the private base station 21 via IR transmission, the mobile station 20 may then safely begin/resume wireless RF communications, which are now encrypted pursuant to the embedded encryption key(s). The subscriber is then able to move more freely throughout the building, all the while taking advantage of the inexpensive wireline communications link through the PSTN 24, as discussed hereinbefore.

In another embodiment of the present invention, the private base station 21 may periodically emit an IR signal, which the mobile station 20 may intercept, if close enough. In effect, the private base station may perform an IR poll to establish the preliminary IR linkage to exchange security information, such as the aforedescribed encryption keys. For example, upon detection (in photodetector 30), the mobile station 20 may (like the private base station 21 in the previous embodiment) also respond with an IR response signal, which may include encryption key(s) for governing the subsequent RF transmissions with the private base station 21, thereby providing a procedure for periodic or random security measures.

In still another embodiment of the present invention, the more secure IR communications link may be employed by the subscriber of the mobile station 20 or an administrator of the private telephone system to transfer other, noninitialization-related information. For example, if particularly sensitive information needs to be transmitted during an RF communication, the mobile station 20 and private base station 21 may switch to the more private IR communications mode and resume the RF mode transmissions after the sensitive information has been transferred. It should also be understood that the mobile station 20 and private base station 21 may automatically revert to the IR communication mode while in range of each other and only switch over when the IR transmissions begin to deteriorate.

The previous description is of preferred embodiments for implementing the invention, and the scope of the invention should not necessarily be limited by this description. The scope of the present invention is instead defined by the following claims.

What is claimed is:

1. A private telecommunications system for secure wireless communications, said private telecommunications system comprising:

a private base station having transceiving means therein for communicating in a first and a second communication mode;

at least one mobile station, in wireless communication with said private base station, said at least one mobile station wirelessly communicating with said private base station in said first communication mode using an infrared signal and in said second communication mode using a radiofrequency signal; and wherein, prior to communicating in said second communication mode, said at least one mobile station transmits a request message in said first communication mode to said base station to request security-related data for use in conducting said communications in said second communication mode between said at least one mobile station and said base station.

2. The private telecommunications system according to claim 1, wherein said private base station and said mobile station transceive a plurality of messages therebetween in said second communication mode, wherein, prior to transceiving a security message therebetween, said private base station and said mobile station switch transceiving to said first communication mode, and transmit said security message in said first communication mode.

3. The private telecommunications system according to claim 2, wherein said private base station and said mobile station, upon completion of the transceiving of said security message, switch transceiving therebetween to said second communication mode.

4. The private telecommunications system according to claim 2, wherein said security message comprises a plurality of encryption keys for the subsequent encryption of a plurality of said messages transceived in said second communication mode.

5. The private telecommunications system according to claim 2, wherein upon said mobile station switching said transceiving to said first communication mode, said mobile station transmits an infrared request message to said private base station.

6. The private telecommunication system according to claim 5, wherein said private base station, upon receipt of said infrared request message, transmits said security message to said mobile station.

7. The private telecommunication system according to claim 6, wherein said security message comprises a plurality of encryption keys for the subsequent encryption of a plurality of said messages transceived in said second communication mode.

8. The private telecommunication system according to claim 1, wherein said transceiving means within said private base station comprises:
   infrared transceiving means for transceiving infrared signals within said mobile station in said first communications mode;
   radiofrequency transceiving means for transceiving radiofrequency signals with said mobile station in said second communications mode; and
   switching means for switching between said infrared and radiofrequency transceiving means.

9. The private telecommunication system according to claim 8, wherein said infrared transceiving means comprises:
   a photodetector for receiving said infrared signals from said mobile station; and
   an infrared emitter for transmitting said infrared signals to said mobile station.

10. The private telecommunication system according to claim 1, wherein said transceiving means within said mobile station comprises:
    infrared transceiving means for transceiving said infrared signals with said private base station in said first communications mode;
    radiofrequency transceiving means for transceiving said radiofrequency signals with said private base station in said second communications mode; and
    switching means for switching between said infrared and radiofrequency transceiving means.

11. The private telecommunication system according to claim 10, wherein said infrared transceiving means within said mobile station comprises:
    a photodetector for receiving said infrared signals from said private base station; and
    an infrared emitter for transmitting said infrared signals to said private base station.

12. The private telecommunication system according to claim 1, wherein said private telecommunication system is a cordless system.

13. A method for establishing a secure communication link between a dual-mode mobile station and a dual-mode private base station of a private telecommunication system, a first mode of said dual-mode being an infrared mode and a second mode of said dual-mode being a radiofrequency mode, said method comprising the steps of:
    forwarding an infrared request message from said mobile station to said base station to establish a secure communication link in said infrared mode to request security-related data for use in conducting said second communication mode between said at least one mobile station and said base station;
    establishing said secure communication link between said mobile station and said private base station, said secure communication link operating in said infrared mode; and
    transferring, during said secure communication link, a security message between said mobile station and said private base station in said infrared mode.

14. The method according to claim 13, wherein prior to said establishment of said secure communication link, said mobile station and said private base station operated in said radiofrequency mode.

15. The method according to claim 13, wherein, in said step of forwarding, said mobile station forwards said infrared request message to said private base station, and said private base station, upon receipt of said infrared request message, replies with an infrared reply message.

16. The method according to claim 13, wherein said security message comprises a plurality of encryption keys for the subsequent encryption of a plurality of transmissions in said radiofrequency mode.

17. The method according to claim 13, further comprising, after said step of transferring said security message, the step of:
    establishing a radiofrequency communication link between said mobile station and said private base station in said radiofrequency mode.

18. The method according to claim 13, further comprising, after said step of transferring said security message, the step of:
    forwarding, from said private base station, a security poll signal to said mobile station.

19. The method according to claim 18, wherein said step of forwarding said security poll signal occurs periodically.

20. The method according to claim 18, wherein said step of forwarding said security poll signal occurs randomly.

21. A mobile station for secure wireless communications in a private telecommunications system, said mobile station comprising:
    radiofrequency transceiving means for transceiving a plurality of radiofrequency transmissions within said private telecommunications system;
    infrared transceiving means for transceiving a plurality of infrared transmissions within said private telecommunications system; and
    wherein, prior to transceiving said plurality of radiofrequency transmissions, transceiving an infrared request signal between said mobile station and a base station to request security-related data for use in encrypting said plurality of radiofrequency transmissions.

22. The mobile station according to claim 21, wherein said infrared transceiving means comprises:
    a photodetector for receiving said infrared transmissions; and
    an infrared emitter for transmitting said infrared transmissions.

23. The mobile station according to claim 22, wherein said infrared emitter comprises a light-emitting diode.

24. The mobile station according to claim 21, wherein said mobile station switches transceiving from said radiofrequency transceiving means to said infrared transceiving means prior to the transmission of an infrared security message within said private telecommunications system.

25. The mobile station according to claim 24, wherein, after the transmission of said infrared security message, said mobile station switches transceiving to said radiofrequency transceiving means.

26. The mobile station according to claim 24, wherein said infrared security transmission comprises a plurality of encryption keys for the subsequent encryption of a plurality of said radiofrequency transmissions between said mobile station and said private telecommunications system.

27. A private base station for secure wireless communications in a private telecommunications system, said private base station comprising:

radiofrequency transceiving means for transceiving a plurality of radiofrequency transmissions within said private telecommunications system;

infrared transceiving means for transceiving a plurality of infrared transmissions within said private telecommunications system; and wherein prior to transceiving said plurality of radiofrequency transmissions, transceiving an infrared request signal between said base station and a mobile station to request security-related data for use in encrypting said plurality of radiofrequency transmissions.

28. The private base station according to claim 27, wherein said infrared transceiving means comprises:

a photodetector for receiving said infrared transmissions; and an infrared emitter for transmitting said infrared transmissions.

29. The private base station according to claim 28, wherein said infrared emitter comprises a light-emitting diode.

30. The private base station according to claim 27, wherein said private base station switches transceiving from said radiofrequency transceiving means to said infrared transceiving means prior to the transmission of an infrared security message within said private telecommunications system.

31. The private base station according to claim 30, wherein, after the transmission of said infrared security message, said private base station switches transceiving to said radiofrequency transceiving means.

32. The private station according to claim 30, wherein said infrared security transmission is between said private base station and a mobile station within said private telecommunications system.

33. A method for providing secure communications between a mobile station and a base station in a private telecommunications system, comprising the steps of:

transmitting an infrared request message between said mobile station and said base station, said infrared request message transmitted in an infrared mode;

transmitting an infrared response message in said infrared mode between said mobile station and said base station in response to the infrared request message, said infrared response message including security-related data for use in connection with communications between the mobile station and the base station; and establishing a secure communication link using the security-related data for use in communicating between the mobile station and the base station in a radiofrequency mode.

34. The method of claim 33, wherein the security-related data includes an encryption key.

35. The method of claim 34, wherein the step of establishing a secure communication link comprises the steps of:

encrypting information for transmission using the encryption key; and transmitting the encrypted information in the radiofrequency mode.

36. The method of claim 33, wherein the infrared request message and the infrared response message are transmitted when the mobile station and the base station are within infrared communication range, and at least some communications in the radiofrequency mode on the secure communication link are conducted when the mobile station and base station are not within infrared communication range.

37. The method of claim 33, wherein the infrared request message is transmitted from the mobile station to the base station, and the infrared response message is transmitted from the base station to the mobile station.

38. The method of claim 33, wherein the infrared request message comprises a periodic infrared transmission from the base station and the infrared response message includes an encryption key and is transmitted by the mobile station.

* * * * *